3,124,692
PHOTOSENSITIVE PATTERN TRACING DEVICE
Frans Brouwer, Glencoe, Ill., assignor to Stewart-Warner Corporation, Chicago, Ill., a corporation of Virginia
Filed Oct. 10, 1960, Ser. No. 61,698
10 Claims. (Cl. 250—202)

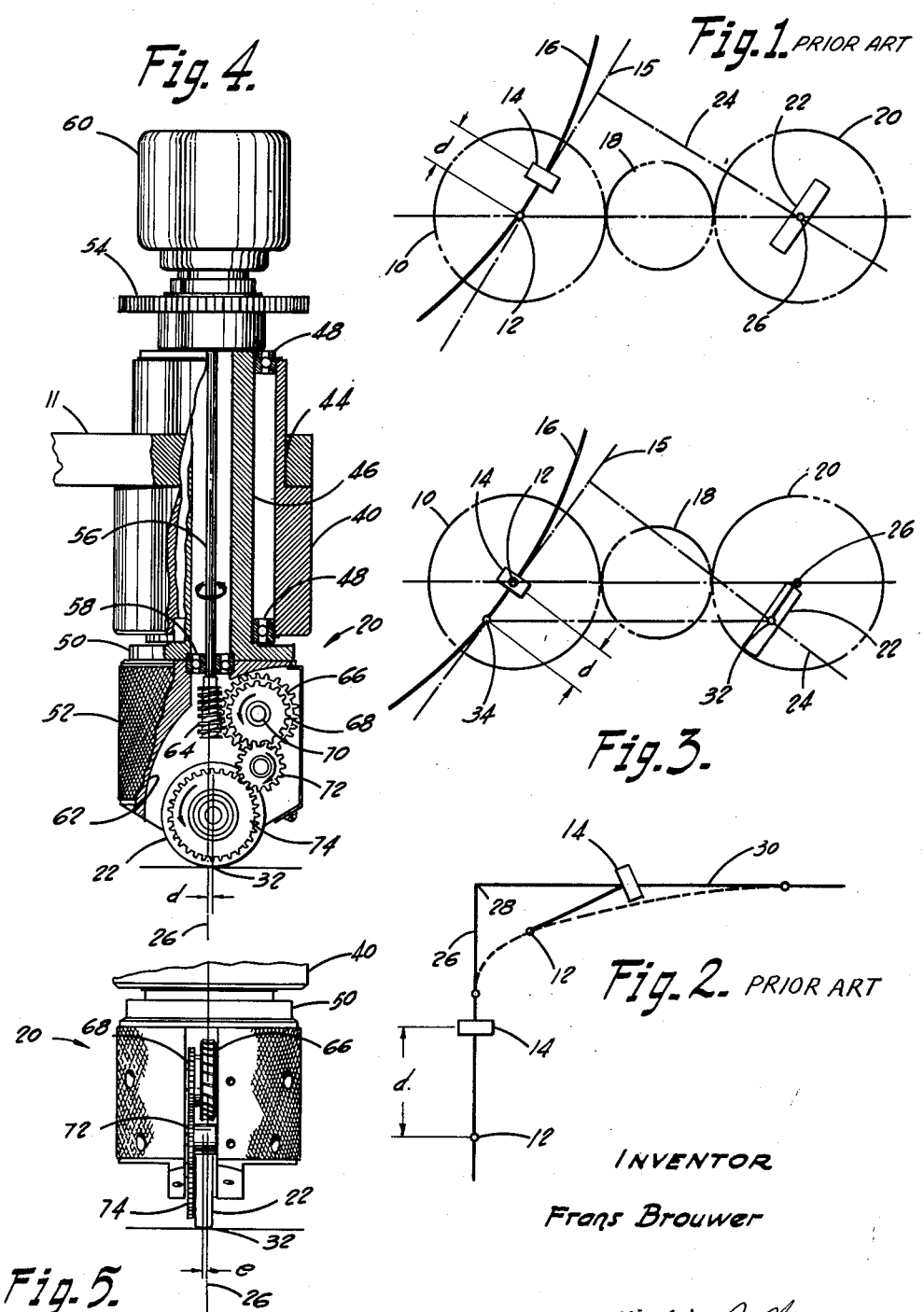

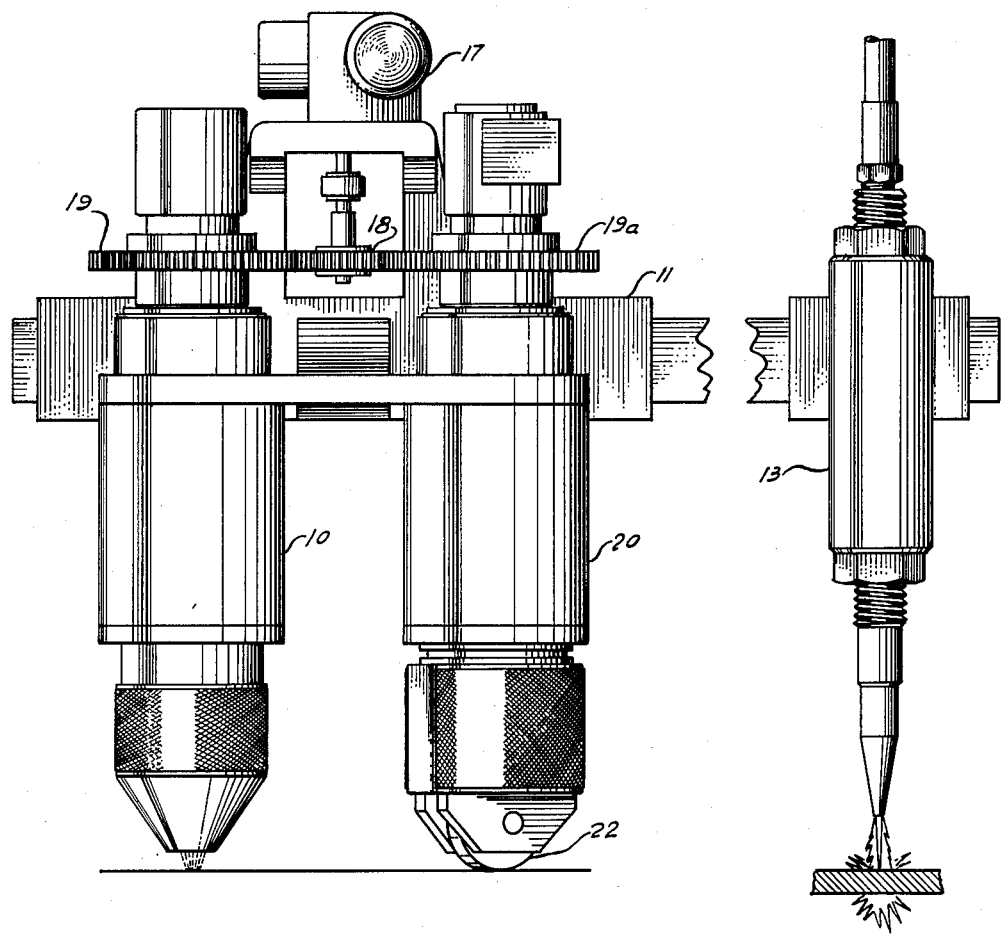

This invention relates to pattern tracing systems. More particularly it relates to steering mechanisms for pattern tracing systems which are driven by a traction wheel in engagement with a surface coinciding with or parallel to the surface containing the pattern. For an example of this type of pattern tracer reference is made to my copending application No. 56,920 filed September 19, 1960.

In systems of this type the pattern sensing element is mounted within a rotatable head. The head is propelled and steered by a mechanism including a traction wheel, the operation of which is controlled by the sensing element. The traction wheel is generally driven at a constant velocity and is caused to turn the sensing head in accordance with the transverse deviation of the sensing element from the desired pattern. A work tool or slave mechanism is usually connected to the sensing head and is caused to move in accordance with the axis of rotation of the sensing member. Therefore it will follow appreciably the same pattern as that followed by the sensing head.

In order for a system of this sort to have steering sense it is necessary that there be at least a slight displacement between the point at which the pattern is being scanned and the point at which the steering force is applied. This displacement is in a direction parallel to a tangent to the pattern at the point being scanned. Heretofore, the sensing element, the driving mechanism and the slave member have been so arranged that only the sensing element would truly follow the pattern whereas the slave member and the driving wheel would follow a path somewhat removed from the pattern when it was changing direction.

The tracing error caused by the steering displacement precludes the use of the device in situations where precise accuracy is required unless inconvenient precautions are taken. To use the devices of the prior art where accuracy is required it is necessary to alter the pattern at every point at which the pattern changes direction rapidly. The calculation and drawing of the modified pattern increases the cost of the pattern tracing process so as to reduce its effectiveness in industrial applications. In complex patterns the adjustments made thereto can, of course, only be approximations, and the path followed by the slave mechanism will still not accurately follow the desired path.

It is therefore an object of this invention to provide a pattern tracing system which more accurately follows the desired tracing pattern.

It is another object of this invention to provide a steering mechanism for a pattern tracing system which eliminates tracing error.

It is also an object of this invention to provide a steering mechanism for a pattern tracing system in which the slave mechanism as well as the pattern sensing element accurately follow the desired path.

Another object of this invention is to provide a line tracing system in which the slave tool accurately follows the desired path at a constant linear velocity with respect to the line being traced regardless of the complexities of the pattern.

Other objects and advantages of this invention will become apparent to one skilled in the art upon a further reading of this specification especially when taken in view of the accompanying drawings in which:

FIG. 1 is a schematic vertical projection of a line tracing system as provided in the prior art showing the general relationship of the driving mechanism and the sensing head as it traces a line;

FIG. 1a is an elevation view of a line tracing system of the type to which the teachings of this invention may be applied;

FIG. 2 is a schematic representation of the type of inaccuracies that arise as the prior art device follows a change in direction of the pattern line;

FIG. 3 is a vertical projection of a pattern tracing system which embodies the present invention and shows the general relationship of the driving mechanism and the sensing head;

FIG. 4 is an elevation view partially in section of a drive mechanism embodying this invention and adapted for use with the line tracing system disclosed in my copending application hereinbefore cited; and FIG. 5 is a fragmentary side view of the drive mechanism of FIG. 4.

In a pattern tracing system of the type shown in FIG. 1a certain tracing errors are incurred because of the mechanical arrangement of the components. As shown, a system of this type comprises a sensing head 10 which is rotatably supported within a frame 11. The frame 11 also carries a tool, such as a welding torch 13 which is thus caused to follow the pattern traced by the head 10. Also rotatably supported by the frame is a drive mechanism 20 having a traction wheel 22 which moves the whole assembly with respect to the scanned surface. A steering motor 17 having a pinion 18 in matching engagement with gears 19 and 19a on the sensing head 10 and drive mechanism 20, respectively, rotates these members in accordance with electric signals generated in the sensing head to steer the pattern tracing system.

Reference is now made to FIGS. 1 and 2 for a more detailed analysis of the errors encountered in prior art line tracing systems. The head 10 revolves about a central axis 12 perpendicular to the surface containing the pattern. A sensing element 14 is mounted within the head 10 on the front-to-back axis 15 of the head 10 and is made to follow the pattern line 16. The broken line circle describing the sensing head 10 in FIG. 1 actually represents the pitch diameter of gear 19 which is in engagement with the pinion 18. The pinion is driven by a steering motor 17 responsive to signals from the sensing element in a manner described in detail in my copending application. The drive mechanism 20 also mounts a gear 19a which is in engagement with the pinion 18. The broken line circle describing the drive mechanism 20 actually represents the gear pitch diameter. Thus, the steering motor rotates the head 10 and driving mechanism 20 equally in the same angular direction. As mentioned, the drive mechanism 20 has a traction wheel 22 whose axis of rotation 24 is perpendicular to the front-to-back axis 15 of the sensing head 10. The drive mechanism is itself rotatable about a central axis 26 which is perpendicular to the plane of the surface along which the wheel 22 travels and the plane of the surface containing the line 16. As may be seen the axis of rotation 26 of the driving mechanism 20 intersects the axis of rotation 24 of the traction wheel 22 in the prior art device and consequently passes through the point of contact of the wheel 22 with the surface along which it travels.

Since the sensing head 10 and the driving mechanism 20 are both rotatably supported by the frame their axes of rotation 12 and 26, respectively, will follow the same path of motion. The work tool or torch 13 connected to the frame would also follow a similar path in a plane parallel to that containing the pattern.

It will be noted in FIG. 1 that the sensing element 14 is displaced from the axis of rotation 12 of the sensing head 10 by a distance "d" along the front-to-back axis 15. With the described arrangement of the sensing head 10 and the driving mechanism 20 on the rigid frame, the displacement "d" of the sensing element 14 from the sensing head axis 12 is effectively a displacement of distance "d" from the point of contact of the traction wheel 22 with the surface along which it travels. It is this effective displacement "d" which gives the mechanism its steering sense.

When the sensing element 14 senses that it is no longer directly over the line 16 it provides an electric signal to cause the steering motor to rotate the pinion gear 18 and the driving mechanism 20 to steer the element towards the line. When the sensing element 14 reaches and aligns the front-to-back axis 15 with the line 16 the electric signal for energizing the steering motor ceases. The system is thus maintained in the proper direction and is driven along a path similar to the line by means of the driving force applied to the traction wheel 22.

Since the sensing element 14 is the only point on the sensing head 10 which follows the traced line precisely a sizable error will arise when the direction of the line changes abruptly as may be seen in FIG. 2. Along a straight portion of the line such as at 27, the sensing element 14 and the sensing head axis of rotation 12, displaced therefrom by distance "d," will follow the line and the slave mechanism associated therewith will accurately trace a similar straight line. When the sensing element 14 reaches an abrupt change in the line such as at the corner 28 the sensing element will immediately sense the change and provide a signal for the steering motor to rotate the drive mechanism 20 to steer the sensing element along the portion 30 of the line beyond the corner 28. As the sensing element 14 progresses along the portion 30 of the line away from the corner the axis of rotation 12 of the sensing head 10 is pulled away from the portion 26 of the line before it reaches the corner 28. As the sensing element progresses still further along the straight portion 30 the axis 12 approaches the straight portion 30 asymptotically. The distorted path of the sensing head axis at the corner in the pattern line 16 will be simulated by the slave mechanism connected to the frame and will therefore trace the same clipped corner path.

The error hereinbefore described is inherent in any tracing system in which the sensing element is effectively displaced from the point which transcribes the motion to the work tool. However, if the displacement was eliminated in the device of FIG. 1 the device would have no steering sense and would not be useful for the intended purpose. In order to use line tracing systems of the type shown in FIG. 1 it is necessary to modify the pattern to be traced in the portions where the line changes direction rather abruptly in order that the slave mechanism will follow more closely the true intended course.

Reference is now made to the schematic drawing of FIG. 3 showing a device including the teachings of this invention. This system is similar to the one shown in FIG. 1 and, therefore, similar reference numerals have been used to refer to similar components. For instance, the broken line circle 10 describes the sensing head which is mounted in the frame (not shown). It is rotatable about an axis 12 and has a sensing element 14 for detecting the line 16. The broken line 10 also represents the pitch diameter of a gear which engages pinion 18 driven by the steering motor (not shown). The broken line circle 20 describes the driving mechanism which is rotatable about its axis 26 and mounted within the frame (not shown). The driving mechanism 20 has a traction wheel 22 which is rotatable about an axis 24 and is driven by gear means to be hereinafter described.

It will be seen in FIG. 3 that the sensing element 14 is positioned in the sensing head 10 along the front-to-back axis 15 so that the axis of rotation 12 of the head intersects the sensing element. The elimination of the displacement of the sensing element 14 from the sensing head axis 12 would eliminate the steering sense of the mechanism if it were not for another modification in accordance with the teachings of this invention. The steering sense is restored by positioning the traction wheel 22 within the driving mechanism 20 so that the axis of rotation 24 of the traction wheel 22 is displaced from the axis of rotation 26 of the driving mechanism 20. The traction wheel axis 24 is again perpendicular to the sensing head front-to-back axis 15 but does not intersect the driving mechanism axis of rotation 26 as is the case with the prior art device of FIG. 1. It will be noted that the wheel 22 has a point of contact 32 with the surface along which it travels which is offset by a distance "d" behind the point of intersection of the driving mechanism axis 26 with the surface. When the driving mechanism 20 is caused to rotate by the steering motor through pinion 18, the driving mechanism axis 26 is caused to describe an arc with respect to the surface on which the traction wheel 22 travels about the point of contact 32 of the wheel. Because of the linkage within the frame of the sensing head 10 and the driving mechanism 20, the sensing head axis of rotation 12 is caused to describe an arc about a point 34 which corresponds to the point of contact 32 of the traction wheel. Since the driving force is applied at a point which is effectively offset from the sensing element the steering sense of the system is maintained. In this apparatus the sensing element 14 coincides with a fixed point on the frame so that the work tool or slave mechanism connected to the frame will describe the same path as the sensing element 14 without the trailing error of the device of FIG. 1.

The device shown in FIG. 3 has the traction wheel 22 positioned so that its point of contact is directly behind the point of intersection of the driving mechanism axis 26 with the surface. It is to be understood that the trailing error will be eliminated as long as the plane containing the axis of rotation 24 of the wheel 22 and the point of contact of the traction wheel with the surface is displaced behind the axis of rotation 26 of the driving mechanism 20. The wheel 22 may also be displaced to one side or the other to reduce other errors such as are encountered in the particular drive mechanism hereinafter described with reference to FIGS. 4 and 5.

The particular drive mechanism shown is designed for use in the control system disclosed in my copending application cited above. The drive mechanism 20 comprises a housing 40 fastened to a frame 11 which also supports the rotatable sensing head. The housing 40 is positioned within an aperture 44 in the frame 11 and supported by suitable bolts (not shown). Within the housing 40 a tubular member 46 is journaled in ball type bearings 48. The tubular member 46 has a flange 50 at its lower end which is secured to a driving head 52 in which is mounted the traction wheel 22.

A gear 54 is fastened to the tubular member 46 at its upper end above the housing 40 and engages the pinion 18 which is driven by the steering motor (not shown). The steering motor will cause the gear 54, the tubular member 46 and the driving head 52 to rotate about the central axis 26 upon receipt of a steering signal from the sensing head as hereinbefore described.

A drive shaft 56 is journaled in ball bearings 58 within the tubular member 46 and is separately rotatable about its axis which is coextensive with the axis of rotation 26 of the drive mechanism. The drive shaft 56 is driven by a motor 60 in engagement therewith at its upper end, and the motor is positionally fixed so as not to rotate with the tubular member 46. The drive shaft 56 extends downward into a recess 62 within the driving head 52 and terminates in a worm 64. A worm wheel 66 is in engagement with the worm 64 and is also affixed to a spur gear 68 to rotate therewith. Idler gear 72 transmits the rotation of the spur gear 68 to a spur gear 74 which is fixed to the traction wheel 22 to rotate therewith.

The traction wheel 22 is positioned within the driving head 52 so that its point of contact 32 with the surface along which it travels is offset a distance "d" behind the axis of rotation 26 of the driving mechanism 20. The driving mechanism as shown in FIG. 4 is oriented to travel in a direction from right to left as one views the drawing. The sensing element in the sensing head is located on the axis of rotation thereof so that the displacement "d" provides the steering sense for the control system.

The motor 60 is a constant speed type in order that the pattern may be traced at a constant velocity. This is especially important when the slave mechanism or work tool is a gas torch cutter wherein variations in its velocity would cause unwanted inaccuracies. Since the driving mechanism 20 is rotatable about an axis which coincides with the axis of the drive shaft 56 it may be seen that a rotation of the driving head with respect to the drive shaft will provide a driving force to the traction wheel 22 . . . i.e., the interaction of the gear teeth on the worm wheel 66 with the worm 64 will cause the worm wheel 66 to rotate as the driving head is rotated and this rotation is transmitted through the spur gear 68, idler gear 72 and spur gear 74 to the traction wheel 22. This interaction causes an acceleration or retardation of the forward velocity of the mechanism depending upon the direction of rotation of the driving head 52.

To compensate for this distortion in the speed, the traction wheel 22 is also displaced so that the point of contact 32 of the wheel 22 with the surface along which it travels is offset a distance "e" to one side from the axis of rotation 26 of the driving mechanism. The direction of offset depends upon the direction of rotation of the drive shaft 56 for forward motion of the system. It will be seen in FIG. 5 that the traction wheel 22 is positioned so that its point of contact 32 is offset to the left of the axis of rotation 26 of the driving mechanism when looking at it from behind. This will compensate for the added velocity imparted to the traction wheel when the driving head is rotated clockwise by causing the traction wheel to trace a larger circumference circle than the axis of rotation 26 would follow. Likewise, for a rotation of the driving head 52 in a counterclockwise direction the traction wheel 22 would follow a shorter circumference than the axis of rotation 26 to compensate for the reduction in velocity. This does not disturb the action of the backward offset of the steering wheel which, as has been explained, is designed to eliminate the trailing error that would otherwise be present if not for the teachings of this invention. The deviation values "d" and "e" are chosen with respect to the particular apparatus design and the accuracy desired. The backward offset "d" of the traction wheel 22 is dependent on the time constants of the machine, gear backlash, etc. The side offset "e" is a mathematical relationship determined by the particular gear train used between the drive shaft and the traction wheel. For a particular apparatus design a backward offset "d" of the order of .040" and a side offset of the order of .015" were found sufficient.

If a device of the type described above with the backward wheel offset and no photocell offset is tracing a pattern which has a sharp angle corner, the inertia of the machine may cause tracing problems. For devices to be used for tracing sharp corners, it may be advantageous to combine the backward wheel offset with a small amount of forward offset of the photocell to overcome the inertia of the device. It is intended that the appended claims include any modifications in which forward offset of the photocell to overcome inertia is provided.

It is to be understood that there are many modifications which may be made to the embodiments of the invention disclosed herein which would be obvious to one skilled in the art after considering the teachings of this invention. It is therefore intended that this invention be limited only by the scope of the attached claims.

What is claimed is:

1. Apparatus for tracing a line or the like comprising a displacement sensing element, means for mounting said element, said mounting means being rotatable about an axis through said sensing element, a traction wheel, means for rotatably mounting said traction wheel, said traction wheel mounting means being rotatable about an axis parallel to the axis of rotation of said sensing element mounting means, means for driving said traction wheel to move said apparatus in a forward direction, said traction wheel being positioned so that its point of contact with the surface along which said traction wheel travels is offset behind the axis of rotation of said traction wheel mounting means a sufficient distance for steering sense.

2. Apparatus for tracing a line or the like comprising a displacement sensing element, means for mounting said element, said mounting means being rotatable about an axis through said sensing element, a traction wheel, means for rotatably mounting said traction wheel, said traction wheel mounting means being rotatable about an axis parallel to the axis of rotation of said sensing element mounting means, means for maintaining the axes of rotation of said mounting means positionally fixed with respect to one another, means for driving said traction wheel to move the apparatus in a forward direction, said traction wheel being positioned so that its point of contact with the surface along which said traction wheel travels is offset behind the axis of rotation of said traction wheel mounting means a sufficient distance for steering sense.

3. Apparatus for tracing a line or the like comprising a frame, means for sensing the line rotatably mounted on said frame about an axis through said sensing means perpendicular to the surface containing the line, a traction wheel, means for rotatably mounting said wheel, said mounting means being rotatably mounted on said frame about an axis perpendicular to said surface, means for simultaneously rotating said sensing means and said wheel mounting means in the same angular direction, means for driving said wheel to move said apparatus in a forward direction, said wheel positioned so that its point of contact with the surface along which it travels is offset behind the axis of rotation of said mounting means a sufficient distance for steering sense.

4. In an apparatus for tracing a line having means for sensing a line rotatably mounted in a frame, a traction wheel, mounting means for the traction wheel rotatably supported by the frame, said line sensing means and wheel mounting means being rotatable about separate axes parallel to one another and perpendicular to the surface containing the line, means for simultaneously rotating the line sensing means and the wheel mounting means in the same angular direction, and means for driving the wheel to move the apparatus in a forward direction, the improvement in which the axis of rotation of said line sensing means passes substantially centrally therethrough and the point of contact of the wheel with the surface along which it travels is offset behind the axis of rotation of said wheel mounting means a sufficient distance for steering sense.

5. Apparatus for tracing a line or the like comprising a displacement sensing element means for mounting said element, said sensing element mounting means being rotatable about an axis through said sensing element, a traction wheel, means for rotatably mounting said wheel, a drive shaft for the wheel whose axis is perpendicular to the axis of said wheel, said traction wheel being rotatable about the axis of said drive shaft, means for driving the drive shaft at a substantially constant angular velocity to move the apparatus in a forward direction, said wheel being positioned so that its point of contact with the surface along which said wheel travels is offset behind and to one side of the axis of rotation of said drive shaft.

6. In an apparatus for tracing a line having means for sensing a line rotatably mounted in a frame, a traction wheel, mounting means for the traction wheel rotatably supported by the frame, a drive shaft for the wheel having an axis perpendicular to the axis of said wheel, said line sensing means and wheel mounting means being rotatable about separate axes parallel to one another and perpendicular to the surface containing the line, means for simultaneously rotating the line sensing means and the wheel mounting means in the same angular direction and means for driving the drive shaft at a substantially constant angular velocity to move the apparatus in a forward direction, the improvement in which the axis of rotation of said line sensing means passes centrally therethrough and the point of contact of the wheel with the surface along which it travels is offset behind and to one side of the axis of said drive shaft.

7. Apparatus for tracing a line or the like comprising means movable in a forward direction for sensing the line, said line sensing means adapted to rotate about an axis perpendicular to the surface containing the line and having a sensing field containing the point of intersection of said axis with the surface, and means for steering said line sensing means having a steering axis perpendicular to the surface containing the line, the steering axis intersecting the plane containing said surface at a point behind the point of intersection of the axis of said line sensing means with the surface a sufficient distance for steering sense.

8. Apparatus for tracing a line or the like comprising means for scanning the line, means for mounting said scanning means, said mounting means being rotatable about an axis substantially throughout the center of scan, a traction wheel, means for rotatably mounting said traction wheel, said traction wheel mounting means being rotatable about an axis parallel to the axis of rotation of the mounting means for said scanning means, means for driving said traction wheel to move said apparatus in a forward direction, said traction wheel being positioned so that its point of contact with the surface along which said traction wheel travels is offset behind the axis of rotation of said traction wheel mounting means a sufficient distance for steering sense.

9. In an apparatus for tracing a line having means for scanning a line rotatably mounted in a frame, a traction wheel, mounting means for the traction wheel rotatably supported by the frame, said scanning means and wheel mounting means being rotatable about separate axes parallel to one another and perpendicular to the surface containing the line and means for simultaneously rotating the scanning means and the wheel mounting means, the improvement in which the axis of rotation of said scanning means passes substantially centrally therethrough and the plane containing the axis of rotation of the wheel and the point of contact of the wheel with the surface along which it travels is parallel to and offset behind the axis of rotation of said wheel mounting means a sufficient distance for steering sense.

10. Apparatus for tracing a line or the like on a pattern comprising sensing means rotatable about an axis perpendicular to the plane of the pattern for viewing the portion of the pattern intersected by said axis, a traction wheel, means for rotatably mounting said traction wheel, said traction wheel mounting means being rotatable about a second axis parallel to said first axis, means for maintaining said axes positionally fixed with respect to one another, means for driving said traction wheel to move the apparatus in a forward direction, said traction wheel being positioned so that its point of contact with the surface along which said traction wheel travels is offset behind the axis of rotation of said traction wheel mounting means a sufficient distance for steering sense.

References Cited in the file of this patent

UNITED STATES PATENTS

| | | |
|---|---|---|
| 2,261,644 | Cockrell | Nov. 4, 1941 |
| 2,276,755 | Anderson | May 17, 1942 |
| 2,461,585 | Anderson | Feb. 15, 1949 |
| 2,522,851 | Tyrner | Sept. 19, 1950 |
| 2,933,612 | Cheverton et al. | Apr. 19, 1960 |